(No Model.)
T. S. STEWART.
AUTOMATIC END GATE.
No. 295,072. Patented Mar. 11, 1884.
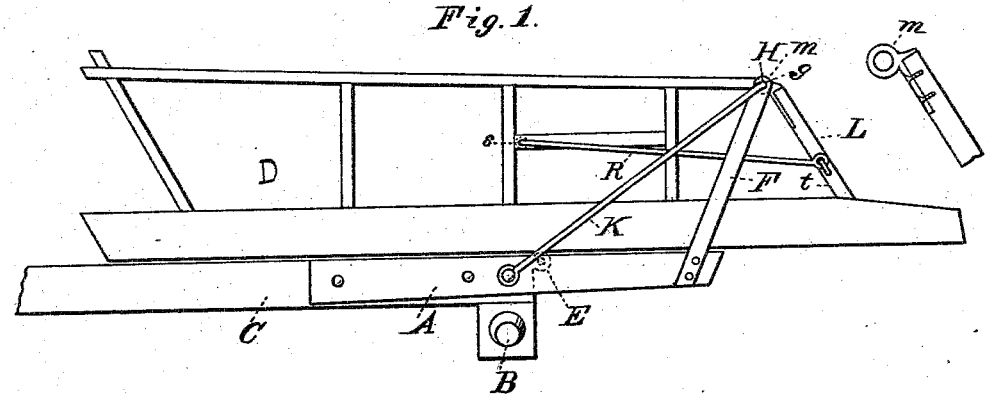
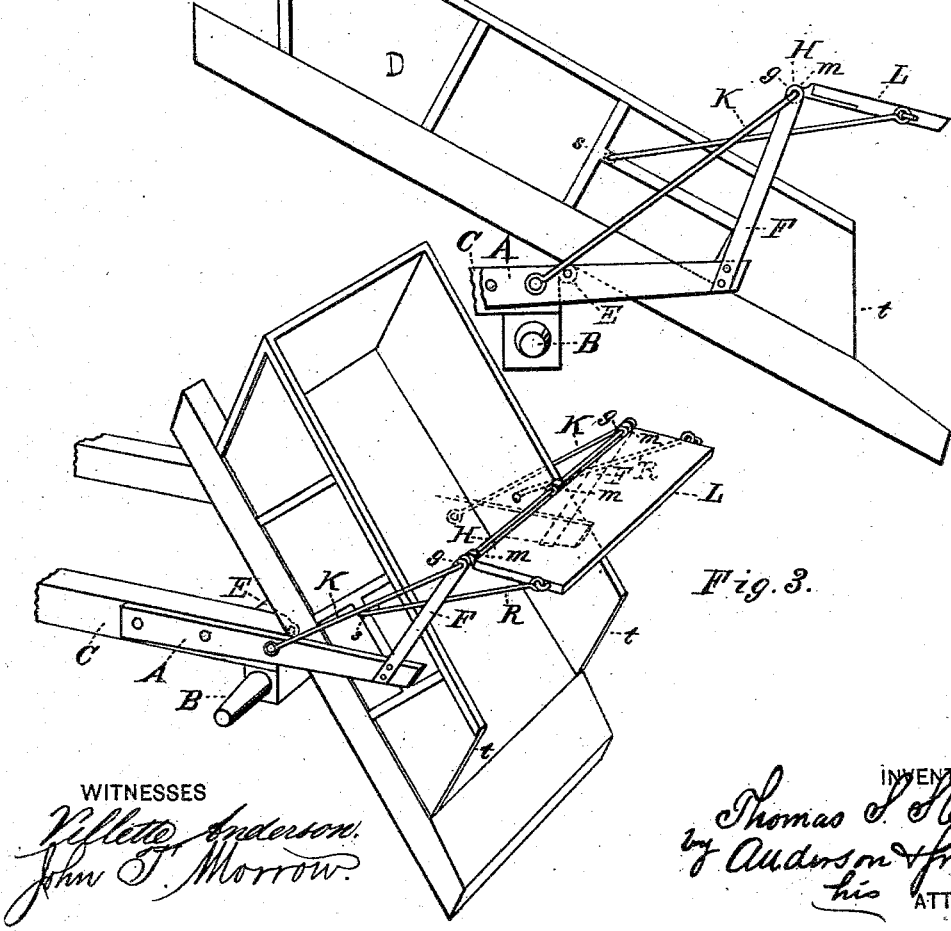
WITNESSES
Villette Anderson.
John T. Morrow.
INVENTOR
Thomas S. Stewart
by Anderson & Smith
his ATTORNEYS

UNITED STATES PATENT OFFICE.

THOMAS S. STEWART, OF SALTSBURG, PENNSYLVANIA.

AUTOMATIC END-GATE.

SPECIFICATION forming part of Letters Patent No. 295,072, dated March 11, 1884.

Application filed December 15, 1883. (No model.)

*To all whom it may concern:*

Be it known that I, THOMAS S. STEWART, a citizen of the United States, residing at Saltsburg, in the county of Indiana and State of Pennsylvania, have invented certain new and useful Improvements in Automatic End-Gates; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of this invention, and is a side view, showing the body of the cart in a horizontal position. Fig. 2 is also a side view, but shows the cart tipped for dumping. Fig. 3 is a perspective view.

This invention has relation to improvements in dumping-carts; and it consists in the construction and novel arrangement of devices, as will be hereinafter more fully set forth, and particularly pointed out in the claim appended.

The object of the invention is to provide a self-acting end-gate or tail-board for dumping-carts.

In the accompanying drawings, the letter A designates the side-bars, which are secured to the axle B or shafts C, and extend to the rear therefrom on each side of the box or bed D, which is hinged to the axle at E.

F represents standards, which are secured to the end portions of the side-bars A, and extend upward, their upper ends being provided with bearings $g$, through which passes the transverse bend or bar H of the iron rod, the end branches, K, of which form the braces, which extend downward and forward, and are at their lower ends secured to said side-bars or to rear extensions of the shafts. In this manner a firm frame is provided, the transverse bar or bend H being located across the upper part of the rear or open end of the cart-bed when said bed is in its level or normal position.

L represents the tail-board or end-gate, the upper portion of which is provided with the hinge-bearings $m$, which are designed to engage the transverse bend or bar H, which forms the bearing from which the end-gate hangs in position against the edges of the sides of the rear end of the cart.

R indicates the rods, which are connected to the sides of the end-gate, near its lower end, by means of eyebolts or other common connecting devices. These rods extend forward, and at their front ends are connected to the cart-bed, as at $s$. Two rods are generally employed, one on each side, although for light carts one would answer. When the cart-bed is dumped, the frame on which the end gate is hung maintains its position, and by means of the rods R the end-gate is thrown out at the bottom, so that the rear end of the bed, which is beveled or sloped at the rear edges, $t$, of its side walls, is allowed to descend, and the contents of the cart to pass out freely under the end-gate, which is held up in elevated position.

I am aware that it is not new to extend the shafts of a dumping-cart rearwardly and provide the same with standards and pivoted arms connecting with the end-gate, for raising the same when the cart is tilted in a dumping position, the gate not being pivoted to the standards, and therefore do not claim such construction, broadly; but, Having described this invention, what I claim, and desire to secure by Letters Patent, is—

In a dumping-cart, the combination, with the body D and shafts C, of the side-bars A, secured to the rear ends of the shafts, the standards F, secured at their lower ends to the side-bars, the transverse bar H, journaled in the upper ends of the standards, carrying the hinged end-gate L, the pivoted straight rods R, connected at their forward ends to the outer side walls of the cart-body, and at their rear ends to the lower side edges of the end-gate, and the brace-rods K, extending from the side-bars to the upper ends of the standards, substantially as specified.

In testimony whereof I affix my signature in presence of two witnesses.

THOMAS S. STEWART.

Witnesses:
J. C. MOORE,
T. M. DICKIE.